Patented Mar. 5, 1935

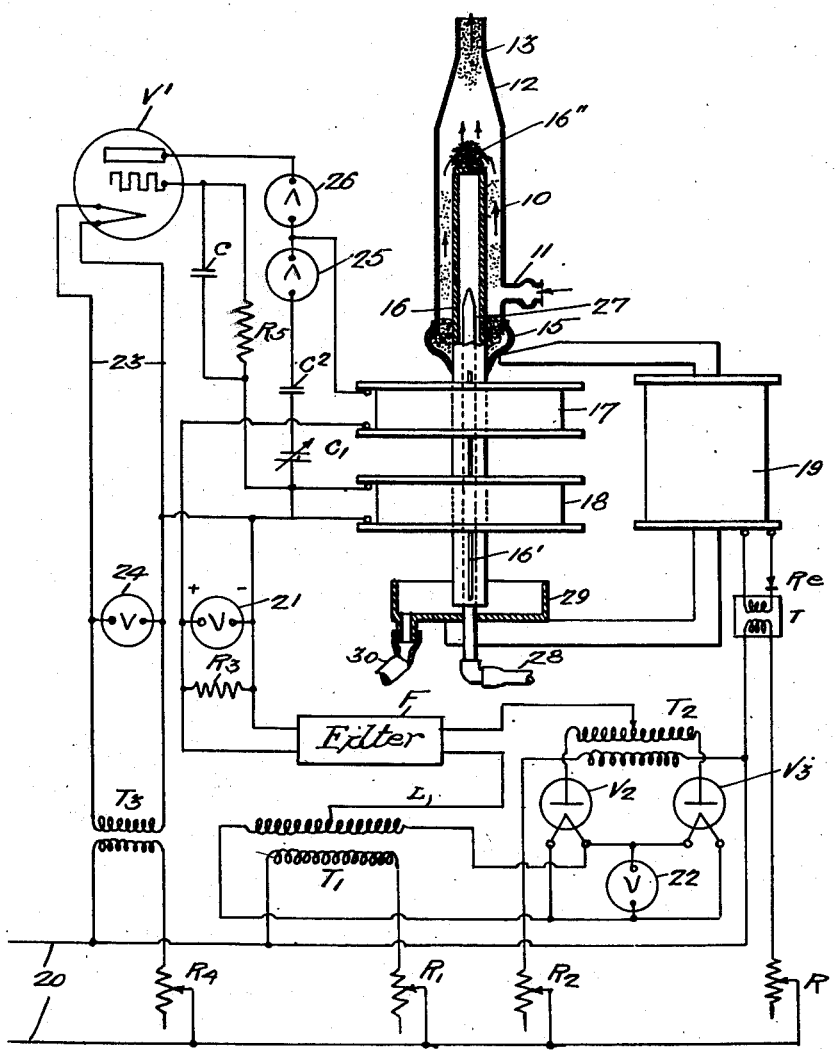

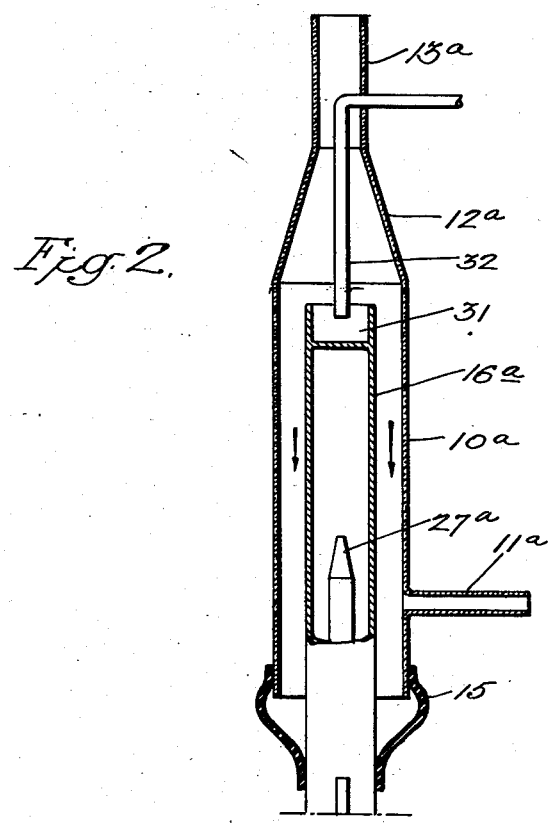
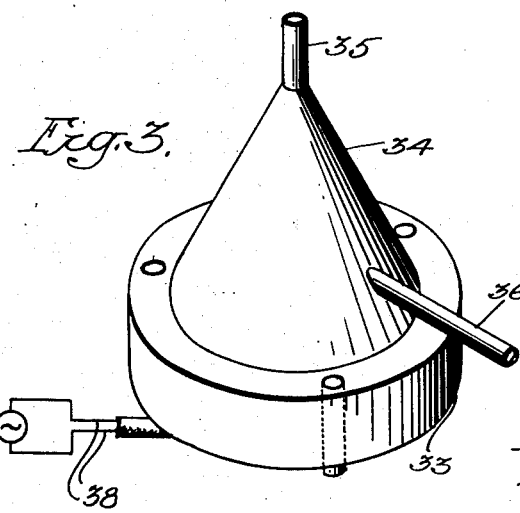

1,992,938

UNITED STATES PATENT OFFICE 1,992,938

METHOD OF DISPERSION

Leslie A. Chambers, Philadelphia, Pa., and Newton Gaines, Fort Worth, Tex., assignors to William H. Ashton, Philadelphia, Pa.

Application November 19, 1932, Serial No. 643,518

8 Claims. (Cl. 252—6)

This invention relates to improvements in methods of preparing dispersions such as emulsions or suspensions of two or more substances, for example oil and water.

The principal object of the invention is to provide an improved method of producing emulsions or suspensions having great stability and a high degree of concentration.

One object of the invention is to provide an improved method of preparing dispersions by bringing the substances into intimate contact with means for producing within the substances a high density of vibrational energy.

Another object of the invention is to provide a method of preparing dispersions by continuously bringing the substances into intimate contact with the vibrational energy-producing means.

A further object of the invention is to provide a method of preparing emulsions or suspensions by causing cavitation of the substances, which results in rapid dispersal of the substances one within another.

Other objects will appear hereinafter. Although various mechanisms and instrumentalities may be used in practicing the proposed method, there are illusrated in the accompanying drawings, for the purpose of disclosure, certain specific forms of apparatus. In these drawings:

Figure 1 is a diagrammatic illustration of a preferred form of apparatus for practicing the method;

Figure 2 illustrates a modified form of the apparatus; and

Figure 3 illustrates a still further modification of the apparatus.

Generally speaking, in practicing the method with any suitable type of apparatus, the substances are introduced into a container and are brought in a restricted area into intimate contact with an energized physical element, which produces within the substances a high density of vibrational energy, whereby the substances are completely dispersed one within another and the desired dispersion is formed. The vibrating element is vibrated at a frequency and amplitude of vibration giving intense vibrational energy. The intensity of energy produced is directly proportional to the square of the frequency and to the square of the amplitude. It will be appreciated that any suitable vibrating element may be employed but unless there is a sufficient intensity of vibrational motion or energy, the desired dispersion will not be satisfactorily obtained.

Referring particularly to Figure 1 of the drawings, the numeral 10 designates a flask or container which is preferably made of glass so that its contents may be observed, but both its shape and material are subject to variation. The flask is formed to provide an inlet portion 11 into which the substances to be acted upon are introduced, the substances flowing in the direction of the arrows. The upper portion of flask 10 is formed to provide a conical portion 12 and the flask terminates in an outlet portion 13 through which the resulting dispersion passes.

The bottom of the flask is suitably secured in a supporting socket 15 which is preferably formed of flexible material, such as rubber, so as to have little damping effect on the vibrating element hereinafter mentioned. The bottom of the flask has a fluid-tight connection with the socket. A vibrating tube 16 extends upwardly through the socket and concentrically in the flask. The upper end of the tube is flat and terminates below the conical portion 12. The relative diameters of the flask and tube are such as to leave a restricted or narrow annular space therebetween.

Tube 16 is preferably formed of nickel, although any other suitable magnetic material may be used. The tube is adapted to vibrate in an electromagnetic field, as will be more fully apparent hereinafter. It is to be understood, however, that any suitable vibrating element operatively associated with actuating means therefor may be used to practice the method. The apparatus illustrated in Figure 1 has been tested and the tube 16 caused to vibrate in an electromagnetic field in resonance with a 2000 volt oscillating power circuit. Satisfactory results were had by using a tube ¾ inch in diameter vibrating at 8900 cycles per second.

A pair of stationary solenoids or coils 17 and 18 surround the lower end of tube 16 below the socket and within the field of an electromagnet 19. Supply conductors 20 are connected with a suitable source of electrical energy, which may be a conventional commercial source of 115 volts at 60 cycles. The supply conductors lead to the electromagnet 19 and a variable resistor R, a transformer T and rectifier Re are interposed in this circuit. Resistor R serves as a regulating means to permit regulation of the voltage and current. Transformer T functions as a step-down transformer and the desired voltage is applied to rectifier Re which supplies the desired unidirectional current to magnet 19. A vacuum tube $V_1$ is provided, the capacity of which may be from 250 watts upward. The plate of the tube may be supplied with a potential of 1500 volts (or greater) by means of an ordinary rectifier filter set. This set may comprise a transformer $T_1$ connected to supply conductors 20 through a variable resistor $R_1$ and supplying the filaments of rectifier tubes $V_2$ and $V_3$, the plates of which are connected to the secondary of a step-down transformer $T_2$. The primary of this transformer is connected to supply conductors 20 through a variable resistor $R_2$. The filter is indicated at F and may include inductances and condensers suitably arranged.

The oscillating circuit is of conventional form and is subject to variation. A high resistance leak $R_3$ is provided to discharge the filter condensers. A volt meter 21 is connected to the solenoids 17 and 18. A volt meter 22 is connected across the filament circuit of tubes $V_2$ and $V_3$.

Conductors 23 are connected with the filament or cathode of tube $V_1$ and the secondary of transformer $T_3$, whose primary is connected across supply conductors 20 through a variable resistor $R_4$. The transformer $T_3$ reduces the voltage supplied to tube $V_1$ to a proper filament voltage, which is indicated by voltmeter 24. The grid of tube $V_1$ is connected through condenser C and grid leak $R_5$ to solenoid 18. The plate of tube $V_1$ is connected to solenoids 17 and 18 through a tuning condenser $C_1$. A condenser $C_2$ protects a high frequency ammeter 25 in case of breakdown of the tuning condenser. An ammeter 26 is connected in the plate circuit as illustrated.

Solenoids 17 and 18 are wound on spools of non-conducting material and have bore openings of such size as to give the lower end of the nickel tube 16 ample clearance. The lower portion of tube, which passes through the solenoids, has a longitudinal kerf 16′ preferably less than $\frac{1}{16}$ of an inch wide for the purpose of diminishing the electrical eddy currents. The upper end of the tube is closed by a flat disk 16″. A fairly strong magnetic polarization of the lower portion of the tube is established by means of the electromagnet which is supplied with direct current as above noted.

In operation, the substances, which it is desired to disperse one within the other, are introduced into flask 10 through inlet 11 as above mentioned. The substances pass in the direction of the arrows and during their passage through the flask are subjected to concentrated vibrational motion or energy by intimate contact with the vibrating element 16. The tuning condenser $C_1$ is adjusted to give the oscillating circuit substantially natural frequency of the longitudinal vibrations of tube 16. Resistor R may also be used as a tuning element. The details of operation of the oscillating circuit are well known and need not be described. The phenomena of actual dispersal of one substance in another or the emulsification of the substances by the vibrations is probably quite complex. The darkened areas in Figure 1 illustrate the distribution of energy densities about the nickel vibrator. These areas were determined by observation of the cavitation which occurs only at high critical intensity. It will be noted that the greatest amount of cavitation occurs on top of the cap of the vibrator, a smaller amount near the node of tube 16, a still smaller amount at the apex of the conical portion 12, and still less about the sides of the vibrator due to radially directed sound waves. Such cavitation, produced by the sudden separation of gas or water vapor from solution under sonic tension, results in the local application of forces of a high order. Release of the sonic tension allows the collapse of such cavities with the force of a partially uncushioned water hammer. This force has been estimated at about 400 tons per square inch, independent of the size of the cavity. We have found through experience that such forces will erode the hardest metal, etch glass, etc. Such cavitation appears largely responsible for the rapid dispersal of one material in another. The cavitations are entirely transient, vanishing the instant the energy source ceases to operate.

On the other hand, larger bubbles always appear in a fluid in contact with the nickel vibrator. These are bubbles of gas which rise to the surface after the energy is shut off. They are always white in color and indefinite in outline due to vigorous wave pattern playing constantly at the gas-water interface. Such "resonant" bubbles also play an important part in the dispersion action. They dart about through the mixture, the violence of the vibration on their surfaces scattering either of the phases in the other.

The role played by the resonant bubbles of air or other gas is amplified by the resonant interface patterns produced wherever one phase comes in contact with the other. Thus when an oil is poured over water which is in turn in intimate contact with the vibrator, there is set up at the oil-water interface a complex, grid-like wave pattern which breaks down in both directions simultaneously producing on the one hand an oil in water and on the other a water in oil emulsion.

Briefly, it may be said that the emulsion is caused by the water hammering incident upon cavitation, by violent mixing at the surface of resonant bubbles, and by the breakdown of resonant wave patterns at diphasic interfaces throughout the mixture.

The ease with which one substance may be dispersed in another is dependent upon the interfacial tension existing between the two. The lower the interfacial tension the more easily may a permanent or stable dispersion be formed. Thus in the system benzol-water the interfacial tension is of a high order and correspondingly great difficulty is experienced in producing stable dispersions of one in the other without the addition of some substance to lower the surface tension of the water phase. We have found it possible to form stable emulsions of two or more substances without the addition of a third substance designed to lower the interfacial tension existing between them, for example, we may prepare emulsions or suspensions of the following substances in water without the use of emulsifying substances:

| | |
|---|---|
| Benzol | Mercury |
| Toluol | Vaseline |
| Mesitylene | Solid paraffin |
| Xylol | Flake graphite |
| Cottonseed oil | Lamp black |
| Paraffin | Bone black |
| Corn oil | Kaolin |
| Clove oil | Potato starch |
| Olive oil | Sulphur |
| | Cod liver oil |

In addition emulsions of water in the various oils may be prepared by varying the conditions of treatment. Also emulsions of mercury and suspensions of various solid substances in oils of various types may be obtained. Dispersions of solid materials in liquids may be obtained by passing a liquid containing the solid through the system in contact with the vibrator, for example, permanent suspensions of graphite in oil may be obtained in this manner. Another method is to place the solid material in lump or powdered form at the top of the vibrator, for example, in cup-like recess 31 (Fig. 2). If lump material is employed, the vibrations cause its distintegration into small particles, which are picked up by the liquid brought into contact with the solid particles, and a permanent emulsion is thus formed.

The advantages of this process are as follows:

1. Preparation of finer and more stable emulsions of oleaginous substances in $H_2O$ than heretofore obtainable without the addition of emulsifying agents.

2. Preparation of emulsions and suspensions of all sorts rapidly, efficiently, in considerable volume, and at a reasonable cost due to the commercially useful application of sonic energy in dispersing materials in other substances.

It is pointed out that any cold fluid brought into contact with tube 16, will have a tendency to cool the upper portion of the tube but would not cool the lower portion thereof. In order to cool the tube, a pipe 27 of insulating material is inserted through the core of magnet 19 and extends up into the tube. This pipe has its upper free end reduced to form a spray nozzle so as to spray water or any other cooling fluid into the upper part of the tube and against the inner wall thereof. This spray is rather fine and comparatively little of the fluid is required to keep the tube cool. The cooling fluid may be supplied from any suitable source through pipe 28 and when it is discharged from the bottom of the tube is collected in a tray 29 and carried off through a drain 30. The tray and drain are of such materials as to not interfere with the operation of the electrical elements. The kerf of tube 16 above mentioned is not of sufficient width to allow leakage of sufficient fluid to be objectionable and, as the spools of solenoids 17 and 18 are made of non-conducting material, water or other liquid contacting with the same will not interfere with their operation. If desired, any desired elastic material could be inserted in the kerf as a filler.

In Fig. 2, there is illustrated a modified device in which the flask 10a is provided with portions 11a, 12a, and 13a as before but the direction of travel of the substances is reversed as indicated by the arrows. In this instance, portion 13a constitutes an inlet for one of the substances to be acted upon, while portion 11a constitutes an outlet for the prepared emulsion or suspension. The vibrator tube 16a is modified in that the upper portion thereof is formed to provide a cup-like recess 31 into which the lower end of tube 32 extends. Tube 32 is L-shaped and passes through the wall of the flask as illustrated. This tube serves to conduct another substance to be acted upon, the substance being introduced into the flask via the tube. The means for vibrating tube 16a may be the same apparatus as is illustrated in Fig. 1, or any other suitable apparatus.

In operation of this form of device, the substances are introduced, as above noted, into inlet portion 13a and tube 32. For the purpose of illustration, let us assume that water and oil are to be dispersed, one within the other. The water may be introduced through inlet 13a, while the oil may be introduced through tube 32. The oil will flow into the cup-like receptacle 31 and will intermix with the water. The two substances will be initially subjected to the intense vibrations of the vibrator at the point of greatest cavitation, viz., at the top of the vibrator. The substances then flow through the restricted annular space between the vibrator and the flask, all the while being subjected to intense vibrations due to intimate contact with the vibrator. The emulsion flows out through the outlet 11a, as above noted. It will be seen that the principle of operation and the phenomena attending the same are the same as above discussed in connection with the preferred form.

In Fig. 3, there is illustrated a still further modification of the device. In this instance, there is provided a vibrator unit 33 having an inverted funnel-shaped member 34 superposed thereon and attached thereto. The funnel-shaped member is provided with an inlet portion 35 through which the substances may be introduced and an outlet portion 36 through which the dispersion passes. Unit 33 comprises a large diaphragm and electromagnetic means for intensely vibrating the same. Such a unit is commonly known in the various communication arts. For example, in submarine signaling, such a unit is commonly employed. For the purpose of the present disclosure, it is deemed unnecessary to illustrate or describe this unit in detail, it being sufficient to state that any unit comprising a relatively large diaphragm which may be intensely vibrated will be satisfactory. A source of electrical energy is illustrated diagrammatically at 37 and is connected via conductors 38 to the actuating means of unit 33. Source 37 may take the form of any source having the desired voltage and frequency. Electrical energy at 220 volts and 500 cycles has been successfully used with a submarine signaling unit. Such energy may be derived directly from a source capable of supplying it, or it may be derived through conversion apparatus from a conventional source of lower voltage and frequency.

The inverted funnel-shaped member and the diaphragm of unit 33 together form a chamber into which the substances are introduced. The substances come into intimate contact with the intensely vibrating diaphragm and the desired emulsion or suspension takes place. It might be well to point out that the amplitude of vibration at the center of the diaphragm is in this case of a relatively high order. The funnel is designed to produce a concentration of sonic energy at the apical point through which the mixture of substances must flow. The principle of operation is then the same as previously discussed and the desired results are also obtained in this instance.

Although certain specific forms of apparatus have been disclosed herein to illustrate means for practicing the desired method, it is to be understood that the invention is not limited to any particular apparatus but may be practiced with other forms or modifications of the disclosed forms. Only such limitations as are contained in the appended claims are to be imposed upon the invention.

We claim:

1. A method of preparing dispersions of two or more substances, which comprises passing the substances through a restricted area and subjecting them to high frequency vibrations within the audio range, and further subjecting said substances to a concentration of such high frequency vibrations.

2. A method of preparing dispersions of two or more substances, which comprises bringing the substances together, and causing cavitation of the substances by subjecting the substances to compressional wave vibration within the sonic range of sufficient magnitude to cause rapid dispersal thereof.

3. A method of preparing dispersions of two or more substances by the use of a source of compressional wave energy having a definite direction of compressional vibration which comprises causing the substances to flow towards the source in a general direction normal to the direction of vibration and away from the source in the direction of vibration.

4. An apparatus for preparing dispersions of two or more substances, comprising a source of compressional wave energy of approximately 8000 cycles per second or less, a chamber formed in front of said source and means for causing the substances to flow through said chamber into intimate contact with said source, said source being adapted to produce a transient negative pressure greater than the static fluid pressure whereby cavitation of the fluid results.

5. An apparatus for preparing dispersions of two or more substances, comprising a source of compressional wave energy of approximately 8000 cycles per second or less, means for causing the substances to pass in contact with the vibrations of said source, said source being adapted to produce a transient negative pressure greater than the static fluid pressure whereby cavitation of the fluid results.

6. An apparatus for preparing dispersions of two or more substances, comprising a source of compressional wave energy of aproximately 8000 cycles per second or less, a chamber formed at the top of said source and means for causing the substances to flow over the source in a continuous stream.

7. An apparatus for preparing dispersions of two or more substances, comprising a source of compressional wave energy of aproximately 8000 cycles per second or less, means for cooling said source by fluid circulation therethrough, a chamber formed at the top of said source and means for causing the substances to flow over the source in a continuous stream.

8. An apparatus for preparing dispersions of two or more substances, comprising a source of compressional wave energy having a vibrating diaphragm, means forming a column for the substances above the vibrating diaphragm, said means having an inlet at the lower end of the column and an outlet at the upper end.

LESLIE A. CHAMBERS.
NEWTON GAINES.